(12) United States Patent
Jayanthi et al.

(10) Patent No.: US 9,071,936 B2
(45) Date of Patent: Jun. 30, 2015

(54) METHODS AND DEVICES FOR FACILITATING LOCATION APPROXIMATION IN A CDMA 1X NETWORK

(75) Inventors: Jyothi Jayanthi, San Diego, CA (US); Ashutosh S. Zade, San Diego, CA (US); Thomas K. Rowland, Santa Clara, CA (US); William Peckham, San Diego, CA (US); Han C. Suh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 13/599,448

(22) Filed: Aug. 30, 2012

(65) Prior Publication Data

US 2013/0231114 A1    Sep. 5, 2013

Related U.S. Application Data

(60) Provisional application No. 61/592,770, filed on Jan. 31, 2012.

(51) Int. Cl.
*H04W 4/02* (2009.01)
*H04W 64/00* (2009.01)
*G01S 5/02* (2010.01)

(52) U.S. Cl.
CPC .............. *H04W 4/025* (2013.01); *H04W 64/00* (2013.01); *H04W 64/006* (2013.01); *G01S 5/0236* (2013.01)

(58) Field of Classification Search
CPC ........ G01S 5/0027; G01S 19/34; H04W 4/02; H04W 4/028; H04W 48/16; H04L 67/18; H04L 67/2823; H04L 67/2895
USPC ............. 455/436, 456.1, 456.2, 456.3, 456.4, 455/456.5, 456.6, 456.7, 457
See application file for complete search history.

(56) References Cited

U.S. PATENT DOCUMENTS

| 6,393,294 B1 | 5/2002 | Perez-Breva et al. |
| 7,979,080 B2 | 7/2011 | Kiviranta et al. |
| 2007/0161380 A1 | 7/2007 | Fok et al. |

(Continued)

FOREIGN PATENT DOCUMENTS

| WO | 2007001660 A2 | 1/2007 |
| WO | 2011028452 A2 | 3/2011 |

OTHER PUBLICATIONS

International Search Report and Written Opinion—PCT/US2013/022243—ISA/EPO—Apr. 22, 2013.

*Primary Examiner* — Kashif Siddiqui
(74) *Attorney, Agent, or Firm* — James Hunt Yancey, Jr.; Stanton Braden

(57) ABSTRACT

Apparatus and methods are disclosed for determining a position of an access terminal within a wireless communication network. In some examples, the access terminal retrieves system information from its current serving cell and stores the retrieved system information in memory along with an associated timestamp. Over time, as the access terminal moves about the network, it can accumulate this system information for a plurality of base stations within its memory. By utilizing the system information for a plurality of base stations rather than only the current serving base station, as well as the associated timestamps, additional position information can be provided to the access terminal. Other aspects, embodiments, and features are also claimed and described.

28 Claims, 7 Drawing Sheets

(56) References Cited

U.S. PATENT DOCUMENTS

| | | |
|---|---|---|
| 2008/0227465 A1 | 9/2008 | Wachter et al. |
| 2010/0093376 A1 | 4/2010 | Del Castillo et al. |
| 2010/0159885 A1 | 6/2010 | Selgert et al. |
| 2011/0051665 A1* | 3/2011 | Huang .......................... 370/328 |
| 2011/0250887 A1* | 10/2011 | Tenny .......................... 455/436 |

* cited by examiner

METHODS AND DEVICES FOR FACILITATING LOCATION APPROXIMATION IN A CDMA 1X NETWORK

CROSS-REFERENCE TO RELATED APPLICATIONS & PRIORITY CLAIM

This application claims priority to and the benefit of provisional patent application No. 61/592,770, titled "Methods and Devices for Facilitating Location Approximation in a CDMA 1x Network" and filed in the United States Patent and Trademark Office on Jan. 31, 2012, the entire content of which is incorporated herein by reference as if fully set forth below and for all purposes.

TECHNICAL FIELD

Embodiments of the present invention relate generally to wireless communication, and more specifically to methods and devices for determining a location and/or location information of a wireless access terminal.

BACKGROUND

Wireless communications systems are widely deployed to provide various types of communication content such as voice, video, packet data, messaging, broadcast, and so on. These systems may be accessed by various types of access terminals adapted to facilitate wireless communications, where multiple access terminals share the available system resources (e.g., time, frequency, and power). Examples of such wireless communications systems include code-division multiple access (CDMA) systems, time-division multiple access (TDMA) systems, frequency-division multiple access (FDMA) systems and orthogonal frequency-division multiple access (OFDMA) systems.

Mobile devices used in such wireless communication systems frequently include one or more means of determining their position. These can include but are not limited to the use of global positioning satellites (GPS) and trilateration techniques such as advanced forward link trilateration (AFLT). Each of these positioning techniques generally brings different advantages and disadvantages, providing different trade-offs of accuracy, battery consumption, availability in different areas, etc. The desire for always-available and highly accurate positioning information in concert with the least amount of battery consumption is always desired, and the development of positioning technologies has continued. Embodiments of the present invention are provisioned to address these issues as well as others.

BRIEF SUMMARY OF SOME EMBODIMENTS

The following presents a simplified summary of one or more aspects of the present disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the disclosure provide for determining a position of an access terminal within a wireless communication network. In some examples, the access terminal retrieves system information from its current serving cell and stores the retrieved system information in memory along with an associated timestamp. Over time, as the access terminal moves about the network, it can accumulate system information for a plurality of base stations within its memory. By utilizing system information for a plurality of base stations rather than only the current serving base station, as well as the associated timestamps, additional position information can be provided to the access terminal.

Other embodiments can also be directed to a communication apparatus. Such an apparatus can include a communications interface (e.g., receiver, transmitter, or transceiver). The communications interface can be operatively coupled to a processing module (or controller module). The apparatus can also include a memory coupled to the processing module. The processing module can be configured to obtain position information about the communication apparatus. This processing module can also be configured to analyze system information from multiple base stations (e.g., a first BS, a second BS, a current serving BS, and one or more prior serving BSs). By analyzing BS system information in concert with position information about the communication apparatus, the processing module can be used to localize the communications apparatus. This enables the communication apparatus to be always-available and have highly accurate positioning information in such a way to reduce processing to efficiently use power (e.g., battery) resources. The positioning information may then be passed on to applications that can use the positioning data as a user may desire or to other network components for their use.

In one aspect, the disclosure provides a method of positioning a wireless access terminal, including determining to retrieve position information corresponding to the access terminal, determining system information corresponding to a current serving base station, storing the system information in a memory, storing an associated timestamp with the system information, and transmitting the system information and the associated timestamp for the current serving base station and for at least one prior serving base station, for localization of the access terminal.

Another aspect of the disclosure provides an access terminal configured for wireless communication, including means for determining to retrieve position information corresponding to the access terminal, means for determining system information corresponding to a current serving base station, means for storing the system information, means for storing an associated timestamp with the system information, and means for transmitting the system information and the associated timestamp for the current serving base station and for at least one prior serving base station, for localization of the access terminal.

Another aspect of the disclosure provides a computer program product including a computer-readable storage medium configured for operation at a wireless access terminal. Here, the computer-readable storage medium includes instructions for causing a computer to determine to retrieve position information corresponding to the access terminal, to determine system information corresponding to a current serving base station, to store the system information in a memory, to store an associated timestamp with the system information, and to transmit the system information and the associated timestamp for the current serving base station and for at least one prior serving base station, for localization of the access terminal.

Another aspect of the disclosure provides an access terminal configured for wireless communication, including a processing circuit, a communications interface communicatively coupled to the processing circuit for transmitting and receiving information, and a memory communicatively coupled to the processing circuit for storing information, wherein the processing circuit is configured to determine to retrieve position information corresponding to the access terminal, to determine system information corresponding to a current serving base station, to store the system information in the memory, to store an associated timestamp with the system information, and to transmit the system information and the associated timestamp for the current serving base station and for at least one prior serving base station, for localization of the access terminal.

These and other aspects of the invention will become more fully understood upon a review of the detailed description, which follows.

DETAILED DESCRIPTION OF SOME EMBODIMENTS

In the following description, specific details are given to provide a thorough understanding of the described implementations. However, it will be understood by one of ordinary skill in the art that at least some of the aspects described herein may be practiced without these specific details. For example, circuits may be shown in block diagrams in order not to obscure the implementations in unnecessary detail. In other instances, well-known circuits, structures, and techniques may be shown in detail in order not to obscure the implementations.

In the following description, certain terminology is used to describe certain features of one or more implementations. The terms "access terminal" and "programming" as used herein are meant to be interpreted broadly. For example, an "access terminal" refers generally to one or more devices that communicate with one or more other devices through wireless signals. Such access terminals may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. Access terminals may include mobile terminals, at least substantially fixed terminals, and/or stationary communication components. Examples of access terminals include mobile phones, pagers, wireless modems, personal digital assistants, personal information managers (PIMs), personal media players, palmtop computers, laptop computers, tablet computers, televisions, appliances, e-readers, digital video recorders (DVRs), machine-to-machine (M2M) devices, routers, smartphones, entertainment devices, and/or other communication/computing devices which communicate, at least partially, through a wireless or cellular network.

The term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The various concepts presented throughout this disclosure may be implemented across a broad variety of telecommunication systems, network architectures, and communication standards. Although the discussions herein may present examples of CDMA and 3rd Generation Partnership Project 2 (3GPP2) 1x protocols and systems, those of ordinary skill in the art will recognize that one or more aspects of the present disclosure may be employed and included in one or more other wireless communication protocols and systems.

Figure 1:
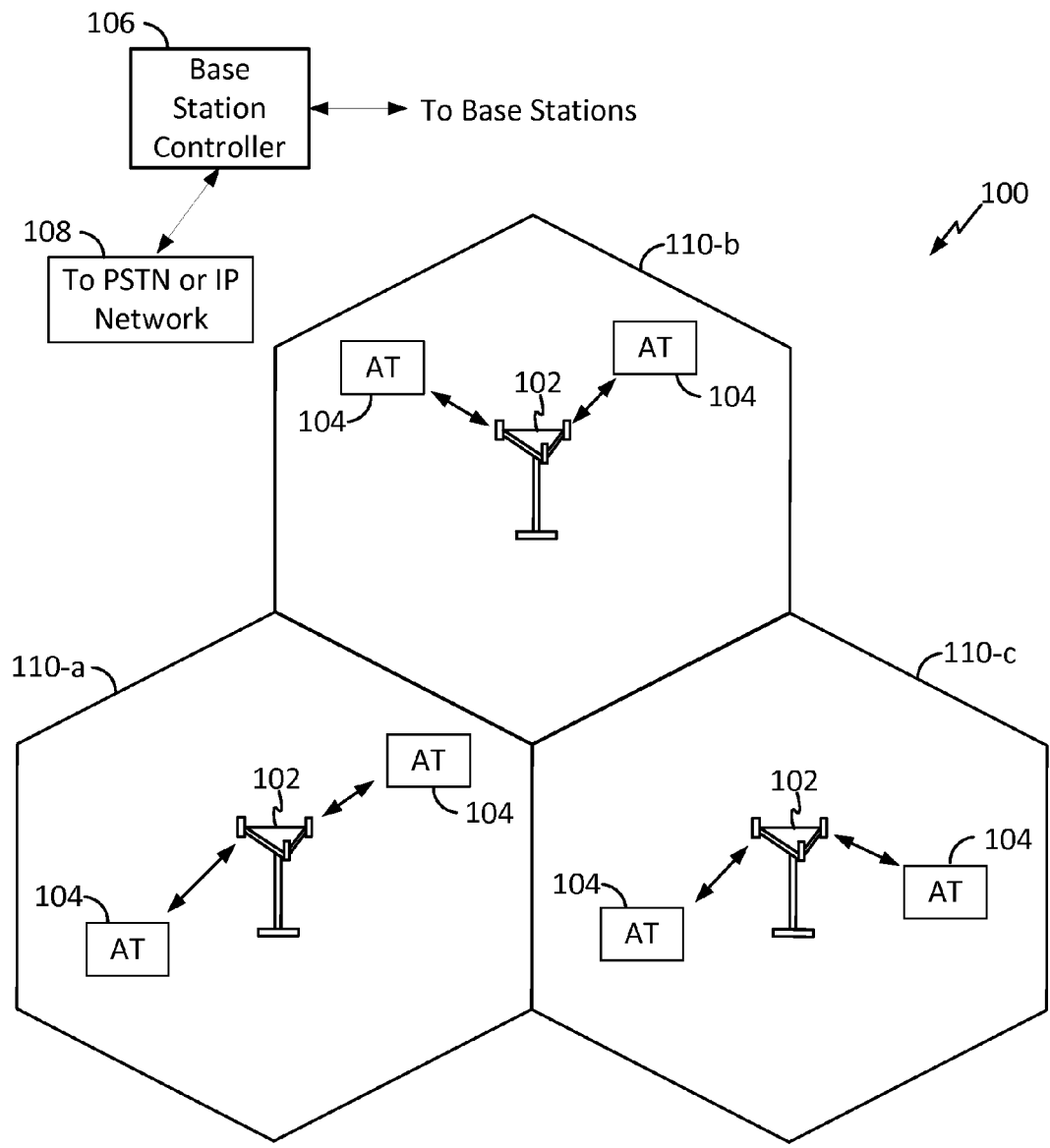
FIG. 1 is a block diagram illustrating an example of an access network in which one or more aspects of the present disclosure may find application.

FIG. 1 is a conceptual diagram illustrating an example of a network environment in which one or more aspects of the present disclosure may find application. The wireless communication system 100 generally includes one or more base stations 102, one or more access terminals 104, one or more base station controllers (BSC) 106, and a core network 108 providing access to a public switched telephone network (PSTN) (e.g., via a mobile switching center/visitor location register (MSC/VLR)) and/or to an IP network (e.g., via a packet data switching node (PDSN)). The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a Single Carrier Frequency Division Multiple Access (SC-FDMA) signal, etc. Each modulated signal may be sent on a different carrier and may carry control information (e.g., pilot signals), overhead information, data, etc.

The base stations 102 may wirelessly communicate with the access terminals 104 via a base station antenna. The base stations 102 may each include a device that facilitates wireless connectivity (for one or more access terminals 104) to the wireless communications system 100. For example, the base stations 102 may include access points, base transceiver stations (BTS), radio base stations, radio transceivers, transceiver functions, basic service sets (BSS), extended service sets (ESS), Node Bs, femto cells, pico cells, and/or some other suitable device.

The base stations 102 are configured to communicate with the access terminals 104 under the control of the base station controller 106 via multiple carriers. Each of the base stations 102 can provide communication coverage for a respective geographic area. The coverage area 110 for each base station 102 here is identified as cells 110-a, 110-b, or 110-c. The coverage area 110 for a base station 102 may be divided into sectors (not shown, but making up only a portion of the coverage area). In a coverage area 110 that is divided into sectors, the multiple sectors within a coverage area 110 can be formed by groups of antennas with each antenna responsible for communication with one or more access terminals 104 in a portion of the cell.

The access terminals 104 may be dispersed throughout the coverage areas 110, and may wirelessly communicate with one or more sectors associated with each respective base station 102. The access terminal 104 may be adapted to employ a protocol stack architecture for communicating data between the access terminal 104 and one or more network nodes of the wireless communication system 100 (e.g., the base station 102).

A protocol stack generally includes a conceptual model of the layered architecture for communication protocols. The layers are represented in order of their numeric designation, where transferred data is processed sequentially by each layer, in the order of their representation. Graphically, the "stack" is typically shown vertically, with the layer having the lowest numeric designation at the base.

Figure 2:
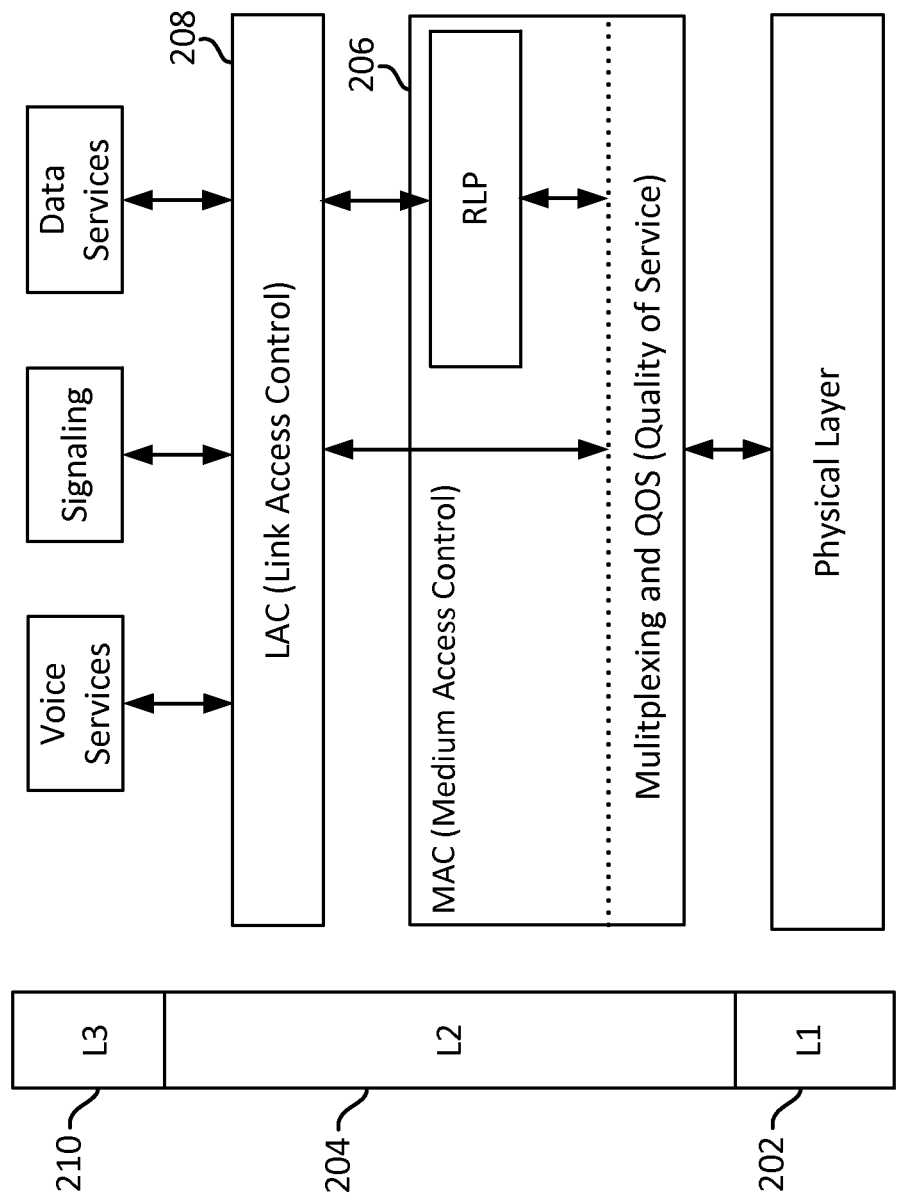
FIG. 2 is a block diagram illustrating an example of a protocol stack architecture which may be implemented for communication between an access terminal and a wireless communication network.

FIG. 2 is a block diagram illustrating an example of a protocol stack architecture which may be implemented by an access terminal 104. Referring to FIGS. 1 and 2, the protocol stack architecture for the access terminal 104 is shown with three layers: Layer 1 (L1), Layer 2 (L2), and Layer 3 (L3).

Layer 1 202 is the lowest layer and implements various physical layer signal processing functions. Layer 1 202 is also referred to herein as the physical layer 202. This physical layer 202 provides for the transmission and reception of radio signals between the access terminal 104 and a base station 102.

The data link layer, called layer 2 (or "the L2 layer") 204 is above the physical layer 202 and is responsible for delivery of signaling messages generated by Layer 3. The L2 layer 204 makes use of the services provided by the physical layer 202. The L2 layer 204 may include two sublayers: the Medium Access Control (MAC) sublayer 206, and the Link Access Control (LAC) sublayer 208.

The MAC sublayer 206 is the lower sublayer of the L2 layer 204. The MAC sublayer 206 implements the medium access protocol and is responsible for transport of higher layers' protocol data units using the services provided by the physical layer 202. The MAC sublayer 206 may manage the access of data from the higher layers to the shared air interface.

The LAC sublayer 208 is the upper sublayer of the L2 layer 204. The LAC sublayer 208 implements a data link protocol that provides for the correct transport and delivery of signaling messages generated at the layer 3. The LAC sublayer makes use of the services provided by the lower layers (e.g., layer 1 and the MAC sublayer).

Layer 3 210, which may also be referred to as the upper layer or the L3 layer, originates and terminates signaling messages according to the semantics and timing of the communication protocol between a base station 102 and the access terminal 104. The L3 layer 210 makes use of the services provided by the L2 layer. Information (both data and voice) message are also passed through the L3 layer 210.

Figure 3:
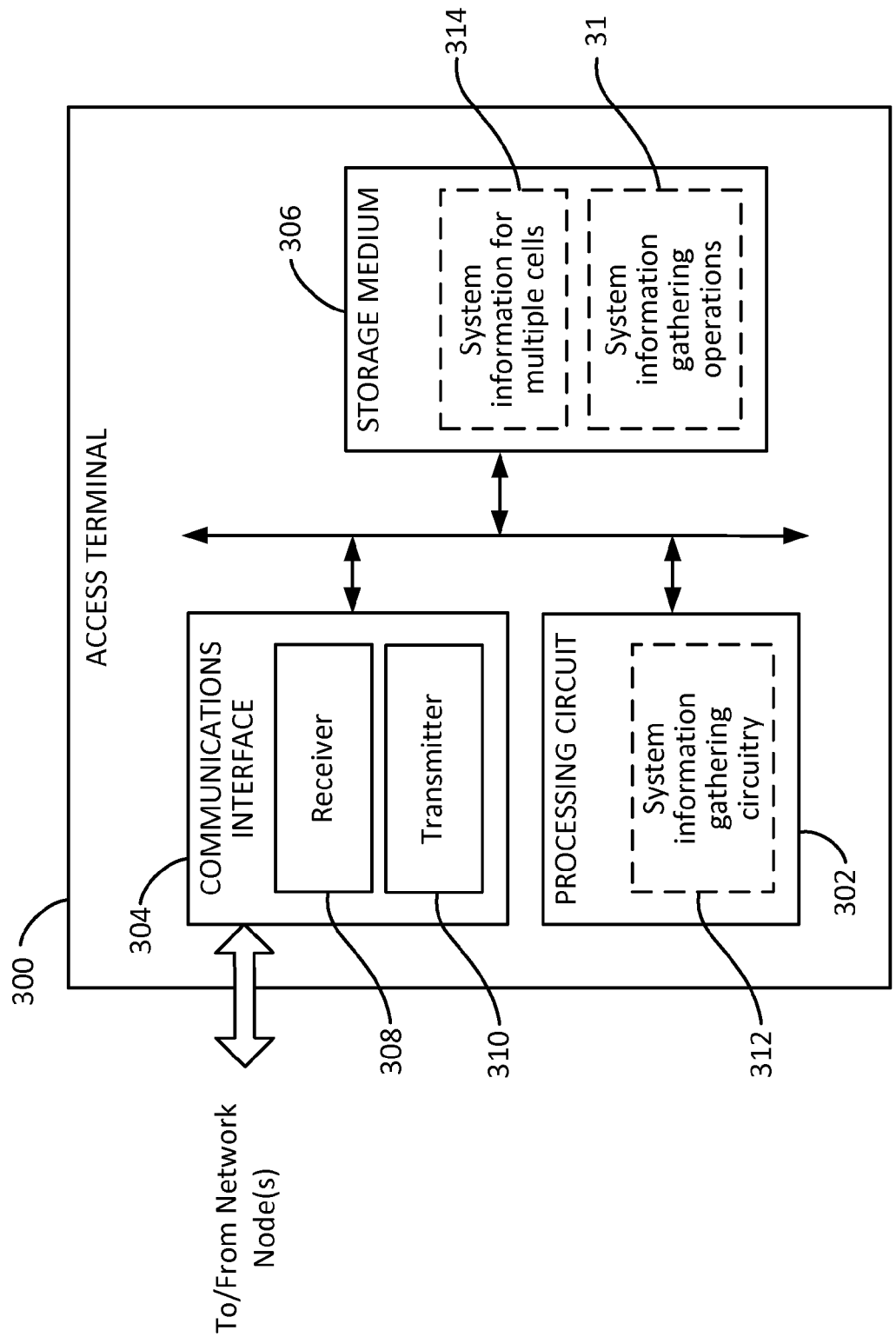
FIG. 3 is a simplified block diagram illustrating some aspects of an access terminal according to one example.

FIG. 3 is a block diagram illustrating select components of an access terminal 300 adapted to employ such features according to at least one example. The access terminal 300 may include a processing circuit 302 coupled to a communications interface 304 and to a storage medium 306.

The processing circuit 302 is arranged to obtain, process and/or send data, control data access and storage, issue commands, and control other desired operations. The processing circuit 302 may include circuitry configured to implement desired programming provided by appropriate media in at least one embodiment. For example, the processing circuit 302 may be implemented as one or more of a processor, a controller, a plurality of processors and/or other structure configured to execute executable instructions including, for example, software and/or firmware instructions, and/or hardware circuitry. Examples of the processing circuit 302 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor but, in the alternative, the processor may be any conventional processor, controller, microcontroller, or state machine. A processor may also be implemented as a combination of computing components, such as a combination of a DSP and a microprocessor, a number of microprocessors, one or more microprocessors in conjunction with a DSP core, or any other such configuration. These examples of the processing circuit 302 are for illustration and other suitable configurations within the scope of the present disclosure are also contemplated.

The processing circuit 302 is adapted for processing, including the execution of programming, which may be stored on the storage medium 306. In some instances, the processing circuit 302 may include system information gathering circuitry 312. The system information gathering circuitry 312 may include circuitry and/or programming adapted to utilize the transmitter 310 and/or the receiver 308 to retrieve system information corresponding to one or more base stations, for the positioning of the access terminal 300.

The communications interface 304 is configured to facilitate wireless communications of the access terminal 300. For example, the communications interface 304 may include circuitry and/or programming adapted to facilitate the communication of information bi-directionally with respect to one or more network nodes. The communications interface 304 may be coupled to one or more antennas (not shown), and includes wireless transceiver circuitry, including at least one receiver circuit 308 (e.g., one or more receiver chains) and/or at least one transmitter circuit 310 (e.g., one or more transmitter chains). By way of example and not limitation, the at least one transmitter circuit 310 may include circuitry, devices and/or programming adapted to provide various signal conditioning functions including amplification, filtering, and modulating transmission frames onto a carrier for uplink transmission over a wireless medium through an antenna.

The storage medium 306 may represent one or more devices for storing programming and/or data, such as processor executable code or instructions (e.g., software, firmware), electronic data, databases, or other digital information. The storage medium 306 may also be used for storing data that is manipulated by the processing circuit 302 when executing programming. The storage medium 306 may be any available media that can be accessed by a general purpose or special purpose processor. By way of example and not limitation, the storage medium 306 may include a non-transitory computer-readable medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other non-transitory computer-readable mediums for storing information, as well as any combination thereof. The storage medium 306 may be coupled to, or at least accessible by the processing circuit 302 such that the processing circuit 302 can read information from, and write information to, the storage medium 306. In the examples, the storage medium 306 may be integral to the processing circuit 302. But in some embodiments these components may be distinct devices.

Programming stored by the storage medium 306, when executed by the processing circuit 302, causes the processing circuit 302 to perform one or more of the various functions and/or process steps described herein. The storage medium 306 may system information gathering operations (i.e., instructions) 314. The transmitter power regulating operations 314 can be implemented by the processing circuit 302 in, for example, the transmitter power regulator 312. Thus, according to one or more aspects of the present disclosure, the processing circuit 302 may be adapted to perform any or all of the processes, functions, steps and/or routines for any or all of the access terminals (e.g., access terminal 104 or 300) described herein. As used herein, the term "adapted" in relation to the processing circuit 302 may refer to the processing circuit 302 being one or more of configured, employed, implemented, or programmed to perform a particular process, function, step and/or routine according to various features described herein.

Figure 4:
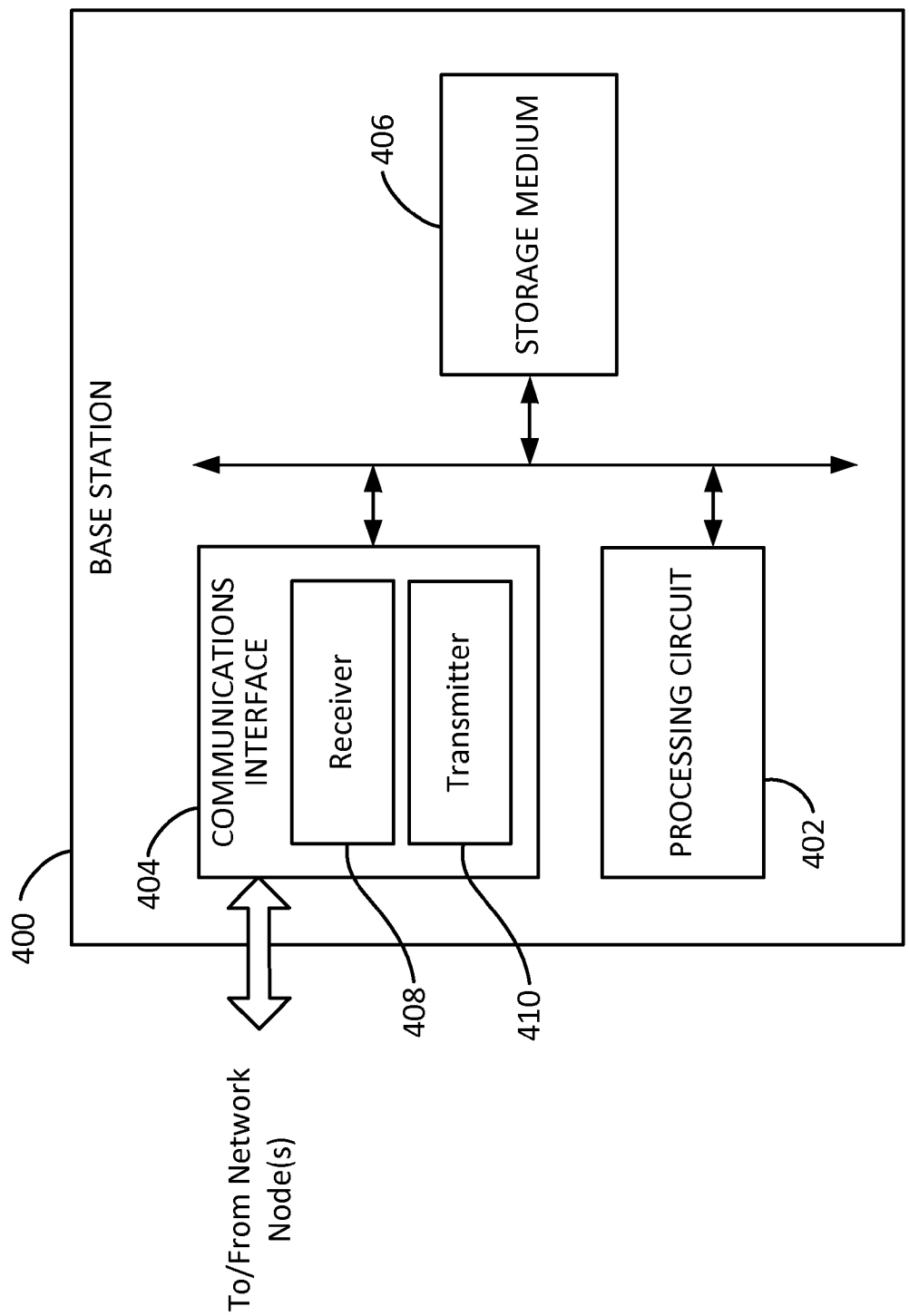
FIG. 4 is a simplified block diagram illustrating some aspects of a base station according to one example.

According to various further aspects of the present disclosure, base stations are provided, which are adapted to transmit pilot signals and to provide various system information to access terminals in their vicinity. Turning to FIG. 4, a block diagram is shown illustrating select components of a base station 400 according to at least one implementation. The base station 400 may include a processing circuit 402 coupled to a communications interface 404 and to a storage medium 406.

The processing circuit 402 is arranged to obtain, process and/or send data, control data access and storage, issue commands, and control other desired operations. The processing circuit 402 may include circuitry configured to implement desired programming provided by appropriate media in at least one example, and may be implemented and/or adapted in a manner similar to the processing circuit 302 described above.

The communications interface 404 is configured to facilitate wireless communications of the base station 400. For example, the communications interface 404 may include circuitry and/or programming adapted to facilitate the communication of information with respect to one or more access terminals 300. The communications interface 404 may be coupled to one or more antennas (not shown), and includes wireless transceiver circuitry, including at least one receiver circuit 408 (e.g., one or more receiver chains) and/or at least one transmitter circuit 410 (e.g., one or more transmitter chains).

The storage medium 406 may represent one or more devices for storing programming and/or data, such as processor executable code or instructions (e.g., software, firmware), electronic data, databases, or other digital information. The storage medium 406 may be configured and/or implemented in a manner similar to the storage medium 306 described above.

Like the storage medium 306, the storage medium 406 includes programming stored thereon. The programming stored by the storage medium 406, when executed by the processing circuit 402, causes the processing circuit 402 to perform one or more of the various functions and/or process steps described herein. Thus, according to one or more aspects of the present disclosure, the processing circuit 402 may be adapted to perform (in conjunction with the storage medium 406) any or all of the processes, functions, steps and/or routines for any or all of the network nodes described herein (e.g., base station 202 and/or base station controller 106 in FIG. 1). As used herein, the term "adapted" in relation to the processing circuit 402 may refer to the processing circuit 402 being one or more of configured, employed, implemented, and/or programmed to perform a particular process, function, step and/or routine according to various features described herein.

In a cdma2000 1x system, an access terminal is generally capable of retrieving system information from a base station in its vicinity. For example, this system information may include active pilot information such as a cell ID, a latitude and longitude of the base station 400, pilot strength, etc. However, in conventional systems, such system information for neighboring cells not currently serving the access terminal is generally unavailable. That is, because the derivation of this information would generally require the access terminal to detach from its current serving base station and attach to the neighboring base station, such information is not available to the conventional access terminal. Thus, some aspects of the present disclosure make suitable system information from neighboring cells available to the access terminal 300. This can assist and/or improve positioning of the access terminal 300 without substantially (or at all) affecting conventional communication protocols as well as making efficient use of power resources.

Figure 5:
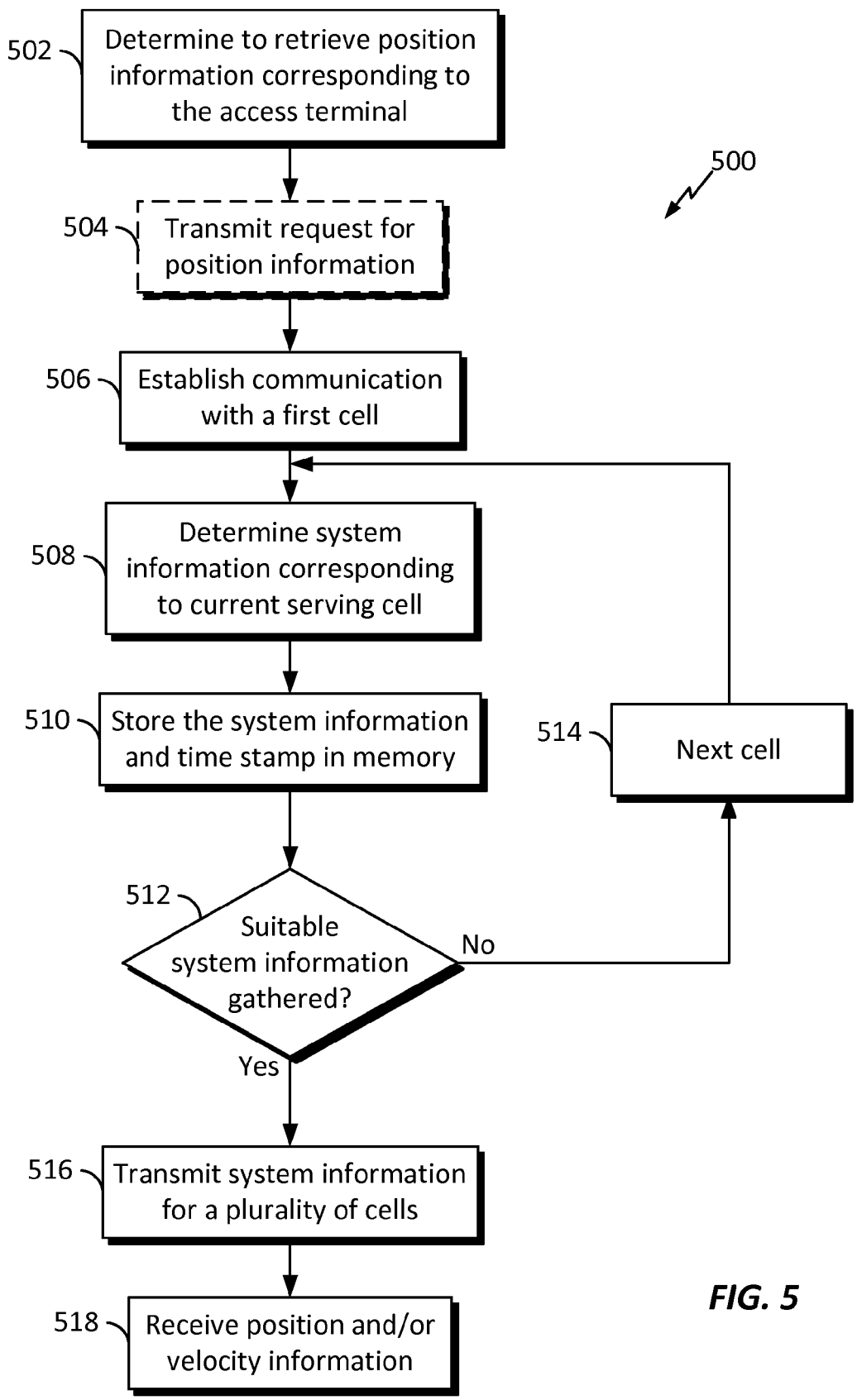
FIG. 5 is a flow chart illustrating a process for determining a position of an access terminal according to one example.

Referring now to FIG. 5, a flow chart is provided to illustrate a process 500 of positioning a wireless access terminal such as the access terminal 300 illustrated in FIG. 3 within a wireless communication network in accordance with some aspects of the disclosure. In some examples, the process 500 may operate at the access terminal 300 within the access network 100 illustrated in FIG. 1, which as described above may be configured for operation according to cdma2000 1x standards. Of course, those of ordinary skill in the art will comprehend that any suitable wireless communication system may be utilized within the scope of the present disclosure.

At step 502, the access terminal 300 may make a determination to find its position. In some examples, this determination may be made by the processing circuit 302 at the access terminal 300 in accordance with any suitable stimulus, such as a mapping application, a request from a user utilizing a user interface, etc. In other examples, this determination may be made by the access terminal 300 in response to the reception of a request from the network (e.g., transmitted by the base station 400) for the access terminal 300 to provide information from which the position may be determined.

At step 504, the access terminal may optionally transmit a request for position information. That is, in some aspects of the disclosure, the access terminal 300 may actively request position information from the network, such that the network can determine and transmit the location information to the access terminal 300 as described in further detail below. Of course, in other examples, wherein the access terminal 300 receives a request from the network to provide the system information for a plurality of base stations 400, the transmission of the request for position information at step 504 may be omitted.

At step 506, the access terminal 300 may establish communication with a first base station 400. For example, the access terminal 300 may be turned on at this point, or the access terminal 300 may utilize mobility procedures to hand over from a neighbor cell to the first base station 400.

At step 508, the access terminal 300 may determine system information corresponding to the current serving cell, which at this time corresponds to the first base station 400. That is, when the access terminal 300 is served by a base station 400, the access terminal 300 can derive a list of parameters corresponding to that base station 400. For example, these parameters may include a cell identifier (cell_ID), a system ID (SID), and a network ID (NID). Here, with the combination of the SID, NID, and cell_ID, a globally unique identifier for a particular base cell is available. With a suitable database storing cell service locations, position information of the cell may be determined based on this cell identifier. Furthermore, these parameters may include a base station latitude, a base station longitude, a pilot strength, and/or a reference pseudo-random number (PN) used by the base station 400. Still further, these parameters may include the number of antennas utilized by the base station 400, whether the antennas are directional and which direction they transmit, etc. With the latitude and longitude associated with the base station 400 corresponding to that cell, and with the pilot strength and directionality of the pilot transmitted by that base station 400, additional position information can be determined.

Still further, the system information retrieved at step 508 may include an associated time stamp for recording the time at which the system information is retrieved. In a CDMA system, the clock is synchronized to GPS time. That is, an access terminal 300 configured for the CDMA system retrieves its time reference from the network, and the network synchronizes its time to the global positioning system (GPS). In another example, some aspects of the present disclosure may utilize a local clock at the access terminal 300 to obtain the associated time stamp. Of course, any suitable source for the time stamp may be utilized within the scope of the present disclosure.

At step 510, the access terminal 300 may store in memory (e.g., in the storage medium 306) the system information retrieved at step 508 from the current serving base station 400. In this way, in accordance with an aspect of the disclosure, the retrieved system information can be available to the access terminal 300 at a later time, e.g., when the first base station 400 is no longer serving the access terminal 300.

In various examples, system information corresponding to any suitable number of cells may be retained in the memory at any time. For example, the access terminal 300 may store system information from a predetermined number of cells, or in other examples, the number of cells for which the system information is stored may be set by the access terminal 300 and/or the network in accordance with suitable factors.

At step 512, the access terminal 300 may determine whether system information corresponding to a sufficient number of cells has been gathered. If not, then the process may proceed to step 514, wherein the access terminal 300 may move to a second base station 400. For example, conventional mobility procedures may be utilized in accordance with movement of the access terminal 300 from one location to another. In another example, the access terminal may select another base station 400 to serve the access terminal 300 in accordance with any suitable handover procedure.

Following the handover to the second base station at step 514, the process may return to steps 508 and 510, determining the system information corresponding to the current serving cell and storing this retrieved system information in memory. This loop, including the handover from cell to cell and the determining of system information for each cell in turn may proceed any suitable number of times, so that the access terminal 300 may accumulate the system information for a plurality of base stations 400 over time.

Figure 6:
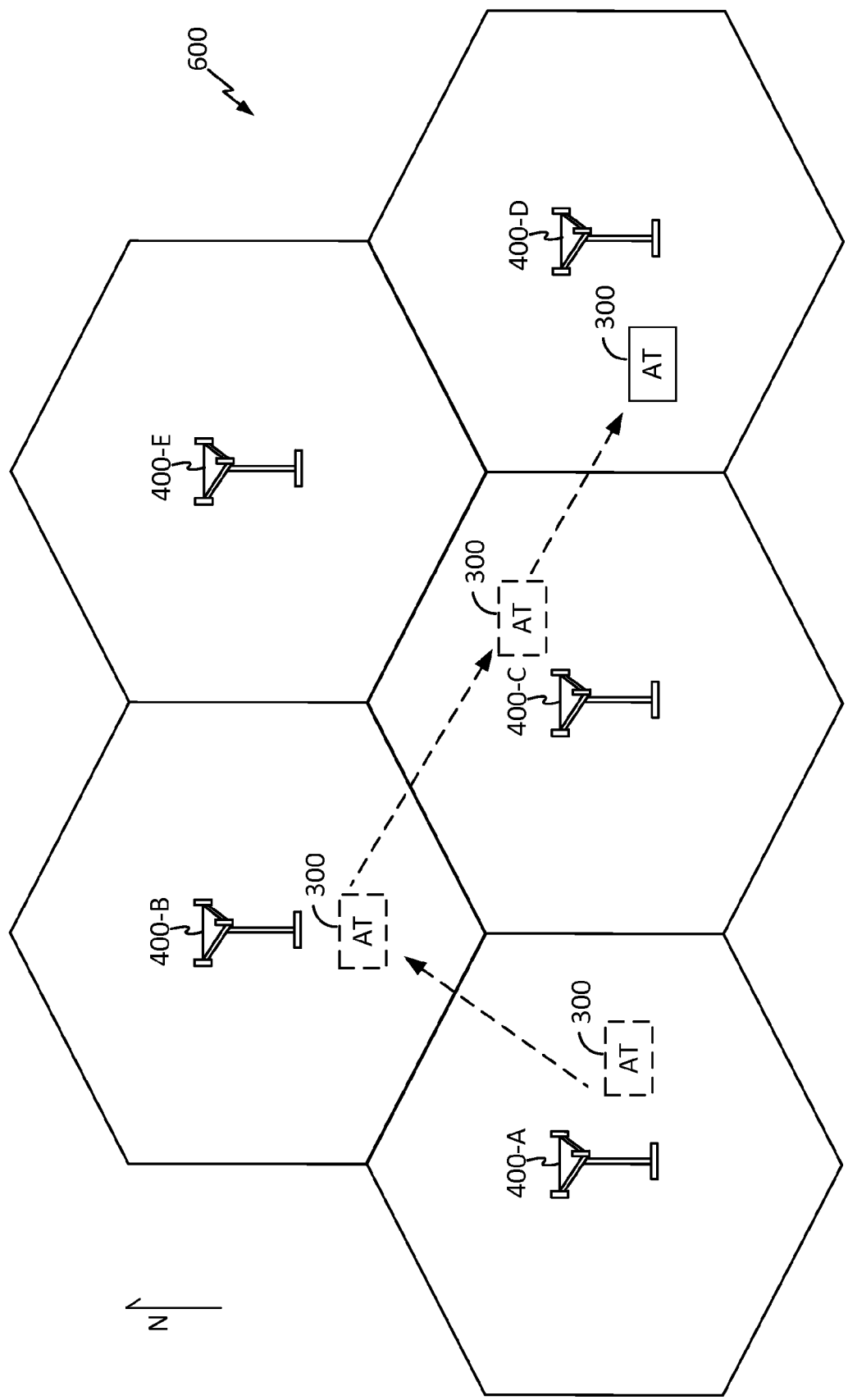
FIG. 6 is a conceptual diagram illustrating an access terminal moving about an access network and accumulating system information for a plurality of cells according to one example.

Referring now to FIG. 6, a portion of an access network 600 is illustrated to show one example of an access terminal 300 moving through the access network 600 and accumulating system information for a plurality of base stations 400. As seen in this example, the access terminal 300 first establishes communication with a first base station 400-A and according to an aspect of the present disclosure obtains and stores system information corresponding to the first base station 400-A. As the access terminal 300 thereafter moves in a northward direction on the illustration, it may utilize conventional mobility procedures to handover to a second base station 400-B. At this time, as described above, the access terminal 300 may obtain and store system information corresponding to the second base station 400-B. This procedure may repeat as the access terminal 300 continues to move about the access network 600, handing over to a third base station 400-C and a fourth base station 400-D. Thereby, system information for the plurality of base stations 400-A to 400-D may be accumulated in memory at the access terminal 300 for use positioning the access terminal 300, as described below.

Returning now to FIG. 5, if at step 512 the access terminal 300 determines that sufficient system information has been gathered for the plurality of cells, the process may proceed to step 516, wherein the access terminal 300 may transmit the system information to the network. For example, a software application may access the system information 314 for a plurality of cells stored in memory (e.g., at the storage medium 306) and in some examples may implement suitable processing on the system information. Upon processing (if any), the application may send the system information (or information corresponding thereto) to a location server at the network for processing and determining position information corresponding to the access terminal 300. This determined position information may thereafter be transmitted to the access terminal, such that at step 518 the access terminal 300 may receive the position information.

By utilizing the system information corresponding to a plurality of cells as described above, additional positioning information, e.g., including but not limited to improved accuracy may be obtained when compared to positioning information obtainable only from the system information of the current serving cell. Moreover, as described above, the utilization of time stamp information corresponding to the time when such system information was gathered for each of the plurality of cells can provide further enhancement of the position information obtainable therefrom. For example, some aspects of the disclosure may provide information corresponding to a path of the access terminal 300 over time. For example, referring once again to FIG. 6, by considering time stamps corresponding to the time when system information was obtained from each of the four base stations 400-A, 400-B, 400-C, and 400-D, the path taken by the access terminal 300 among these cells may be determined and accordingly relayed to the access terminal 300. Similarly, if a series of the most recently retrieved system information indicates little or no movement, it may be known that the access terminal 300 is stationary.

Still further, the time stamp information may enable the position information may be adapted to additionally include velocity information corresponding to a velocity of the access terminal 300. That is, by determining the time difference between the obtaining of the system information of base stations 400 having known locations, a velocity of the access terminal 300 may be determined corresponding to its movement from cell to cell over time. Similarly, if the speed component of the velocity is unavailable or undesired, more simple direction information may be so obtained and transmitted to the access terminal 300.

Figure 7:
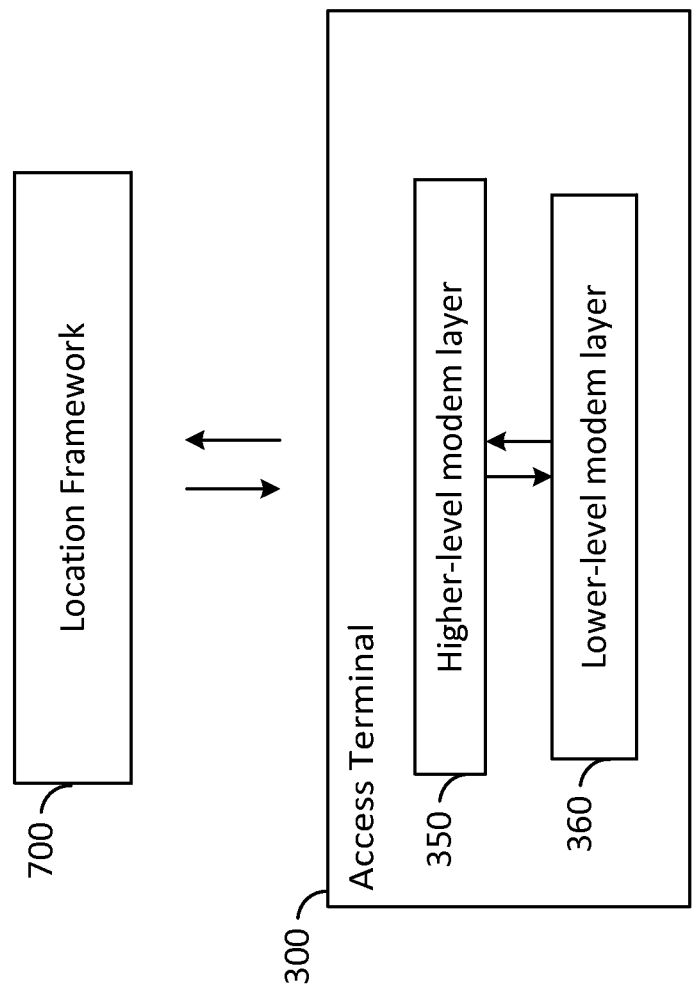
FIG. 7 is a conceptual diagram illustrating additional details of an access terminal according to one example.

FIG. 7 is a conceptual diagram providing additional details of one or more aspects of the disclosure. In the illustration, the access terminal 300 is shown in communication with a location framework 700. In various examples, the location framework may be embodied by any suitable network entity such as a server configured for determining the position information in accordance with the system information provided by the access terminal 300.

Within the access terminal 300 may reside certain functionality represented in the illustration by an upper layer 350 and a lower layer 360. Here, the upper layer 350 may represent an application layer at the access terminal 300, and the lower layer 360 may represent the physical and/or MAC layers 202 and/or 206 described above in relation to FIG. 2.

In an aspect of the disclosure, the lower layer 360 at the access terminal 300 may search for pilot information, measure pilot strength, and perform other suitable lower-layer functions for gathering cell transmission information from one or more cells nearby the access terminal 300. That is, the lower layer 360 may generally concentrate on the pilot, e.g., seeking transmission characteristics such as the signal energy, without determining the higher-order system information such as the SID, the NID, etc. In some aspects of the disclosure, the lower layer 360 may include access to stored information corresponding to a set of pilots that have been acquired by the access terminal 300 over time. Here, if it is determined that an acquired pilot matches one of the stored set of pilots, parameters corresponding to the cell transmitting that pilot may be retrieved and sent up to the higher layer 350.

The higher layer 350 may then retrieve the pilot information obtained by the lower layer 360 and access the SID/NID, cell_ID, latitude, longitude, etc. corresponding to the serving cell. Thus, in conjunction, the system information from the higher layer 350 and the lower layer 360 may be provided to the location framework 700, which may thereby determine current and past location of the access terminal 300, its direction and/or velocity, etc. as described above.

One or more of the components, steps, features and/or functions illustrated in FIGS. 1-7 may be rearranged and/or combined into a single component, step, feature or function or embodied in several components, steps, or functions. Additional elements, components, steps, and/or functions may also be added without departing from the invention. The apparatus, devices and/or components illustrated in FIGS. 1, 3, 4, 6, and/or 7 may be configured to implement and/or perform one or more of the methods, features, or steps described in FIG. 5. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The terms "machine-readable medium", "computer-readable medium", and/or "processor-readable medium" may include, but are not limited to portable or fixed storage devices, optical storage devices, and various other non-transitory mediums capable of storing, containing or carrying instruction(s) and/or data. Thus, the various methods described herein may be partially or fully implemented by instructions and/or data that may be stored in a "machine-readable medium", "computer-readable medium", and/or "processor-readable medium" and executed by one or more processors, machines and/or devices.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

We claim:

1. A method, operational on a wireless access terminal, of positioning the wireless access terminal, comprising:
determining to retrieve position information corresponding to the access terminal;
in response to the determining to retrieve position information, determining system information corresponding to each of a plurality of base stations by receiving a transmission from each of the plurality of base stations;
storing in memory the system information corresponding to each of the plurality of base stations, each system information further being stored with a respective time stamp corresponding to a time when the system information is determined;

transmitting the system information corresponding to each of the plurality of base stations and the respective time stamps, for localization of the wireless access terminal; and transmitting accumulated system information corresponding to at least one previous base station, and accumulated timestamps corresponding to the at least one previous base station, the accumulated system information and timestamps gathered over time and stored in the memory as the access terminal moves about an access network comprising the plurality of base stations.

2. The method of claim 1, wherein the determining system information corresponding to each of a plurality of base stations comprises:

in response to the determining to retrieve position information, determining first system information corresponding to a first base station of the plurality of base stations, associating a first time stamp of the respective time stamps with the first system information, and storing the first system information and the first time stamp in the memory;

handing over to a second base station of the plurality of base stations; and determining second system information corresponding to a second base station of the plurality of base stations, associating a second time stamp of the respective time stamps with the second system information, and storing the second system information and the second time stamp in the memory.

3. The method of claim 1, further comprising receiving position information in response to the transmitting of the system information, the position information corresponding at least in part to a position of the access terminal.

4. The method of claim 3, wherein the position information comprises at least one of speed, direction, and/or velocity information corresponding to the access terminal.

5. The method of claim 3, wherein the position information comprises a path that the access terminal has taken.

6. The method of claim 1, wherein the system information comprises at least one of: a cell identifier (cell ID), a system ID (SID), a network ID (NID), a base station latitude, a base station longitude, or a reference pseudorandom number (PN) corresponding to each base station of the plurality of base stations.

7. The method of claim 1, wherein the system information comprises at least one of a pilot strength or a pilot directionality corresponding to each base station of the plurality of base stations.

8. An access terminal configured for wireless communication, comprising:

means for determining to retrieve position information corresponding to the access terminal;

means for determining system information corresponding to each of a plurality of base stations by receiving a transmission from each of the plurality of base stations, in response to the determining to retrieve position information;

means for storing the system information corresponding to each of the plurality of base stations, each system information further being stored with a respective time stamp corresponding to a time when the system information is determined;

means for transmitting the system information corresponding to each of the plurality of base stations and the respective time stamps, for localization of the access terminal; and means for transmitting accumulated system information corresponding to at least one previous base station, and accumulated timestamps corresponding to the at least one previous base station, the accumulated system information and timestamps gathered over time and stored in the memory as the access terminal moves about an access network comprising the plurality of base stations.

9. The access terminal of claim 8, further comprising:

means for determining first system information corresponding to a first base station of the plurality of base stations, associating a first time stamp of the respective time stamps with the first system information, and storing the first system information and the first time stamp in the means for storing, in response to the determining to retrieve position information;

means for handing over to a second base station of the plurality of base stations; and means for determining second system information corresponding to a second base station of the plurality of base stations, associating a second time stamp of the respective time stamps with the second system information, and storing the second system information and the second time stamp in the means for storing.

10. The access terminal of claim 8, further comprising means for receiving position information in response to the transmitting of the system information, the position information corresponding at least in part to a position of the access terminal.

11. The access terminal of claim 10, wherein the position information comprises at least one of speed, direction, and/or velocity information corresponding to the access terminal.

12. The access terminal of claim 10, wherein the position information comprises a path that the access terminal has taken.

13. The access terminal of claim 8, wherein the system information comprises at least one of: a cell identifier (cell ID), a system ID (SID), a network ID (NID), a base station latitude, a base station longitude, or a reference pseudorandom number (PN) corresponding to each base station of the plurality of base stations.

14. The access terminal of claim 8, wherein the system information comprises at least one of a pilot strength or a pilot directionality corresponding to each base station of the plurality of base stations.

15. A non-transitory computer readable medium storing computer executable code, comprising instructions for causing an access terminal to:

determine to retrieve position information corresponding to the access terminal;

determine system information corresponding to each of a plurality of base stations by receiving a transmission from each of the plurality of base stations, in response to the determining to retrieve position information;

store in memory the system information corresponding to each of the plurality of base stations, each system information further being stored with a respective time stamp corresponding to a time when the system information is determined;

transmit the system information corresponding to each of the plurality of base stations and the respective time stamps, for localization of the access terminal; and transmit accumulated system information corresponding to at least one previous base station, and accumulated timestamps corresponding to the at least one previous base station, the accumulated system information and timestamps gathered over time and stored in the memory as the access terminal moves about an access network comprising the plurality of base stations.

16. The non-transitory computer readable medium of claim 15, further comprising instructions for causing an access terminal to:
- determine first system information corresponding to a first base station of the plurality of base stations, associate a first time stamp of the respective time stamps with the first system information, and store the first system information and the first time stamp in the memory in response to the determining to retrieve position information;
- hand over to a second base station of the plurality of base stations; and
- determine second system information corresponding to a second base station of the plurality of base stations, associate a second time stamp of the respective time stamps with the second system information, and store the second system information and the second time stamp in the memory.

17. The non-transitory computer readable medium of claim 15, further comprising instructions for causing an access terminal to receive position information in response to the transmitting of the system information, the position information corresponding at least in part to a position of the access terminal.

18. The non-transitory computer readable medium of claim 17, wherein the position information comprises at least one of speed, direction, and/or velocity information corresponding to the access terminal.

19. The non-transitory computer readable medium of claim 17, wherein the position information comprises a path that the access terminal has taken.

20. The non-transitory computer readable medium of claim 15, wherein the system information comprises at least one of: a cell identifier (cell ID), a system ID (SID), a network ID (NID), a base station latitude, a base station longitude, or a reference pseudorandom number (PN) corresponding to each base station of the plurality of base stations.

21. The non-transitory computer readable medium of claim 15, wherein the system information comprises at least one of a pilot strength or a pilot directionality corresponding to each base station of the plurality of base stations.

22. An access terminal configured for wireless communication, comprising:
- a processing circuit;
- a communications interface communicatively coupled to the processing circuit for transmitting and receiving information; and
- a memory communicatively coupled to the processing circuit for storing information,
- wherein the processing circuit is configured to:
  - determine to retrieve position information corresponding to the access terminal;
  - determining system information corresponding to each of a plurality of base stations by receiving a transmission from each of the plurality of base stations, in response to the determining to retrieve position information;
  - store in the memory the system information corresponding to each of the plurality of base stations, each system information further being stored with a respective time stamp corresponding to a time when the system information is determined;
  - transmit, utilizing the communications interface, the system information corresponding to each of the plurality of base stations and the respective time stamps, for localization of the access terminal; and
  - transmit accumulated system information corresponding to at least one previous base station, and accumulated timestamps corresponding to the at least one previous base station, the accumulated system information and timestamps gathered over time and stored in the memory as the access terminal moves about an access network comprising the plurality of base stations.

23. The access terminal of claim 22, wherein the processing circuit is further configured to:
- determine first system information corresponding to a first base station of the plurality of base stations, associate a first time stamp of the respective time stamps with the first system information, and store the first system information and the first time stamp in the memory, in response to the determining to retrieve position information;
- hand over to a second base station of the plurality of base stations; and
- determine second system information corresponding to a second base station of the plurality of base stations, associating a second time stamp of the respective time stamps with the second system information, and storing the second system information and the second time stamp in the memory.

24. The access terminal of claim 22, wherein the processing circuit is further configured to receive position information utilizing the communications interface in response to the transmitting of the system information, the position information corresponding at least in part to a position of the access terminal.

25. The access terminal of claim 24, wherein the position information comprises at least one of speed, direction, and/or velocity information corresponding to the access terminal.

26. The access terminal of claim 24, wherein the position information comprises a path that the access terminal has taken.

27. The access terminal of claim 22, wherein the system information comprises at least one of: a cell identifier (cell ID), a system ID (SID), a network ID (NID), a base station latitude, a base station longitude, or a reference pseudorandom number (PN) corresponding to each base station of the plurality of base stations.

28. The access terminal of claim 22, wherein the system information comprises at least one of a pilot strength or a pilot directionality corresponding to each base station of the plurality of base stations.

* * * * *